Patented July 25, 1939

2,167,455

UNITED STATES PATENT OFFICE 2,167,455

METHOD AND MEANS FOR INCREASING THE STRENGTH OF BENTONITIC CLAY GELS

Winfred B. Hirschmann, Chicago, Ill., assignor, by mesne assignments, to American Colloid Co., Lead, S. Dak., a corporation of South Dakota No Drawing. Application November 18, 1936, Serial No. 111,428

11 Claims. (Cl. 252—6)

This invention relates to the improvement of slurries or gels formed by the dispersion, mixing or swelling of bentonitic clay in aqueous solution.

Viscous suspensions of a colloidal nature have important fields of application in numerous industries, including, but by no means exclusively, the suspending of insecticides, the thickening of cosmetics, the drilling of oil and gas wells, the manufacture of uniform concrete, and the preparation of asphalt emulsions.

In the drilling of oil and gas wells, for example, viscous muds are employed to lubricate the drill bit, to carry the cuttings out of the well hole, and to provide a substantially impervious lining along the walls of the bore hole so as to prevent the loss of drilling fluid from the hole into the formation in which the hole is being drilled and prevent the seepage of water, gas or slough of the surrounding formations into the hole.

These drilling muds and other colloidal suspensions are generally prepared by the use of clays that possess properties of self-suspension, swelling or gelatinizing in water, particularly the highly colloidal clays such as the bentonites found in the Black Hills region.

While a small amount of bentonitic clay will form a much more vicous suspension with water than ordinary clay, several chemical agents are known to have the property of enhancing the gel strength or thickness of the suspension. Thus it is known that the addition of relatively small amounts of aluminum sulfate, lime, Portland cement, or calcium chloride to dispersions of bentonite in water causes a great increase in their viscosity. It is therefore possible, by the use of such gelling agents, to reduce the amount of solids which otherwise would be required to produce a gel of the desired strength and viscosity and to exercise greater control over the gelling characteristics of the suspension.

For practical operations, however, most of the agents now known are disadvantageous in that their gelling effects are obtained only when they are used in a certain way. Colloidal gels and slurries are generally prepared at the place of use by mixture and dispersion of the bentonitic clay in water. If a gelling agent such as lime be added to the water before the clay is dispersed therein, or if the lime and clay be added to the water together the result is a thin, flocculated suspension of less viscosity than the suspension obtained by the use of bentonitic clay alone. In order to obtain the desired gelation, it is necessary first to add the clay to the water and allow it to become dispersed in the water and then to add the chemical gelling agent, such as lime. This essential procedure, however, requires separate handling of the several materials and careful control over both the order in which they are combined, and, with known gelling agents, the conditions of combination. Moreover, because the clay is more easily mixed into water when added together with the lime there is a tendency for less careful operators to follow the wrong procedure, either accidentally or intentionally.

Accordingly, it is an object of the invention to provide improved methods of preparing viscous gels and improved materials which can be incorporated with colloidal clays in dry form to produce compositions capable of forming gels of much heavier consistency than the gels formed by the use of colloidal or bentonitic clay alone.

Another object of the invention is to provide materials which may be combined with the dry bentonitic clay in proper proportions for any particular use and then added to water or an aqueous solution to form gelatinous dispersions of substantially predetermined strength and viscosity.

Another object is to provide improved gelling agents and compositions which are capable of giving substantially uniform results over all ranges of temperatures usually encountered in the preparation of dispersions therewith and regardless of the degree of mixing employed to combine them with an aqueous solution.

Other objects and advantages of the invention will become apparent from the ensuing description.

I have discovered substances which can be combined with highly colloidal clays such as bentonite in dry form and then added to water with the bentonite, with or without other materials, to form viscous gels comparable to those obtained by the dispersion of highly colloidal clay such as bentonite in water and the subsequent addition of known gelling agents such as lime. I have found that the thinning effect of these known agents when added to water together with the clay is attributable to their rates of solution and reactivity. Before the clay has had an opportunity to disperse and swell in the water these agents react with it, either physically or chemically, to inhibit dispersion and thus to prevent the formation of a viscous gel. I have found also that this inhibiting effect may be avoided by the use of substances which, while capable of exerting a strong gelling influence on the clay, possess such low rates of solution and reactivity that their influence is not exerted until the clay has become dispersed in the water.

In a preferred embodiment of the invention, I employ a small amount of a substance consisting principally of an aluminate of an alkaline earth metal, particularly mono-calcium aluminate. Alkaline earth metal aluminates of this type are not generally available in a pure or substantially pure state. A preferred substance within this class for the purposes of the present invention, however, is commercially available under the name Lumnite.

Lumnite is produced by the fusion of high grade bauxites, such as those obtained from Dalmatia, a province of Yugoslavia, with limestone. Although its chemical structure is not known with certainty, the principal constituent is monocalcium aluminate accompanied by smaller proportions of unstable $5CaO.3Al_2O_3$, or 5:3 calcium aluminate. Iron compounds constitute the next largest group of compounds in Lumnite; they are believed to be present as $Fe_2O_3$, $Fe_3O_4$ and $FeO$, in the order of decreasing importance, while some FeO may be present in the form of a ternary compound with calcium and aluminum. Silica is present, probably in the form of gehlenite, a compound consisting of two parts of CaO, one part of $Al_2O_3$ and one part of $SiO_2$. A characteristic feature of Lumnite is that, unlike natural substances such as Portland cement, it does not liberate lime in solution. This characteristic is apparently attributable to the presence of a large proportion of mono-calcium aluminate.

Clay slurries or gels of a thickness comparable to those produced by the best of the bentonite gelling agents heretofore known may be obtained either by the addition of Lumnite to aqueous dispersions of colloidal clay, or by mixing dry Lumnite with dry bentonitic clay and adding them to water together, or by adding Lumnite to water and then adding the clay. The quantity of Lumnite necessary to impart a desired viscosity to a colloidal clay or bentonite suspension is variable, as will be described hereinafter. In general, however, the amount of Lumnite need not be greater than 10% of the combined weight of Lumnite and bentonitic clay, while the preferred amount for most purposes is from about 0.5% to 3% of Lumnite to from about 99.5% to 97.0% of clay. The action of Lumnite is distinguished from that of other gelatinizing agents such as Portland cement in several respects. Much less of it is required to be mixed with a given clay to get the same increase in consistency. Its thickening ability, while usually affected to some extent by hot water, is influenced to a lesser degree. Furthermore, it can be mixed with water several hours before the incorporation of the bentonitic clay and still give practically the same consistency as when it is added simultaneously or after the colloidal clay is in the water.

As an important feature of the invention, I have found that the degree of increased gel strength obtained by the simultaneous introduction of Lumnite and clay into solution may be conveniently controlled by regulating the size of the Lumnite particles. When Lumnite is used in a pulverized state, the increase in gel strength varies according to the temperature of the solution or suspension, the degree of mixing employed to introduce the Lumnite and bentonitic clay, and the rate of dispersion of the clay. High temperatures and slow mixing result in smaller increases in viscosity and gel strength. Low temperatures and rapid mixing produce gels of greater viscosity. The increase in viscosity is dependent on and varies with the speed with which the bentonitic clay becomes dispersed in the water.

In contrast to these characteristics of the pulverized material, when Lumnite is used in granulated or more coarsely ground form gels of high viscosity are obtained independently of the temperature of the aqueous solution or suspension and the degree of mixing. Thus the use of granulated Lumnite makes it possible to combine the dry gelling agent with bentonitic clay in the proper proportions for any particular industrial use and to transport the mixture to a place of use, where, by simple admixture with water, gels of the desired consistency may be uniformly obtained. Another advantage of the granulated material is that it is more effective when used with clays of bentonitic nature that require a long time to disperse in water.

The terms "granulated", "coarsely ground" and "pulverized" are well comprehended by those skilled in the art. For definiteness, I shall refer to pulverized particles as those which pass through a sieve with 140 meshes per linear inch; to granulated ones, as those which pass through a 10 mesh sieve and are retained on a 60 mesh sieve, or which have an even narrower size range; and to coarsely ground particles as those which are ground to pass through a sieve having between 10 and 60 meshes per linear inch without having the finer particles removed. An example of a minus 40 mesh sample, for instance, would be one having a sieve analysis such as the following:

|  | Per cent |
|---|---|
| Through 40 mesh on 50 mesh | 21.6 |
| Through 50 mesh on 60 mesh | 11.6 |
| Through 60 mesh on 80 mesh | 9.9 |
| Through 80 mesh on 100 mesh | 7.2 |
| Through 100 mesh on 140 mesh | 11.2 |
| Through 140 mesh on 200 mesh | 9.1 |
| Through 200 mesh | 28.8 |

In order to illustrate the practice of my invention, various mixtures consisting of 1½ parts of Lumnite particles ground and sieved to selected degrees of fineness and 98½ parts of dry bentonite were prepared, and equal samples of each mixture were then introduced into separate bodies of water at 25° C., 60° C. and 90° C., respectively. The samples were mixed with the water slowly, and the viscosities of the resulting dispersions were determined at various intervals of time by means of a Stormer viscosimeter. The granulated and coarsely ground samples of Lumnite formed dispersions of substantially uniform high viscosities regardless of the temperature of the water and even when mixed into the water very slowly. The increases in the viscosities of dispersions produced by the samples of smaller particle sizes such as the pulverized ones varied with the temperature of the water into which these samples had been introduced, lower temperatures yielding more viscous and higher temperatures less viscous dispersions.

From the foregoing description, it is apparent that I have provided improved methods of forming colloidal clay dispersions and improved compositions including colloidal clay and a gelling agent which may be mixed with water to form gels of much greater viscosity than are produced when colloidal clay is used alone. These compositions are especially valuable because they may be prepared in the proper manner for any particular use and in such manner that their use requires neither measurements of the individual constituents, nor careful control over the temperature of the aqueous medium into which they are mixed, the degree of mixing, or the order of introduction into the water.

The present invention may be utilized to advantage in connection with the selectively sized gel-forming clay which constitutes the subject of United States Letters Patent No. 2,036,617, granted to Paul Bechtner and myself on April 7, 1936. By combining a gelling agent of the type herein described with dry bentonitic clay selectively sized so as to facilitate slaking, as described in our prior patent, I obtain an improved product which will form gels of extremely high viscosity when mixed with water.

I desire it to be understood that the improved gelling agents and compositions of my invention are effective in the presence of various other materials. Although the foregoing description mentions only water, bentonitic clay and gelling agents, the value of the gels, under many conditions of use, depends on their capacity to hold other materials in suspension. For example, in the preparation of drilling muds, it is frequently desirable to incorporate in the mud a quantity of heavy material such as barytes or iron oxide and thereby to increase the resistance of the mud to gas pressure encountered in drilling. Drilling muds produced in accordance with the present invention are particularly valuable because of their increased viscosity and gel strength and because of their capacity to hold these heavy materials in suspension.

While I have referred to bentonite of the Black Hills region as a type of highly colloidal clay suitable for the preparation of viscous gels or slurries, I do not intend that the invention be limited to the use of clay taken from any particular region. It is applicable to any of the clays, regardless of their source or designation, which are chcaracterized by pronounced self-suspendability, or gel formation, or other colloidal properties. For convenience, I have designated them as bentonitic clays. Similarly, the descriptions of a preferred gel-forming agent and of a particular method of modifying such agent to increase its usefulness are not intended to limit the invention, except as required by the appended claims. Nor is the invention dependent upon the accuracy of the principle or theory to which I attribute the improved results.

I claim:

1. As a new product of manufacture, high gelling bentonitic clay comprising a mixture of bentonitic clay having incorporated therewith in a substantially dry state, a high alumina cement containing mono-calcium aluminate as a principal ingredient and having a slower rate of reaction or solution in water than the rate of dispersion of the bentonitic clay in water of the same temperature.

2. A composition of matter adapted to form a gel of high viscosity when combined with water and comprising finely divided bentonitic clay and a small proportion of finely divided high alumina cement containing mono-calcium aluminate as a principal ingredient.

3. A composition of matter comprising finely divided bentonitic clay and a small proportion of coarsely ground, finely divided high alumina cement containing mono-calcium aluminate as a principal ingredient.

4. The method of increasing the gel strength and viscosity of aqueous suspensions of colloidal clay which comprises combining therewith a small amount of high alumina cement containing mono-calcium aluminate as a principal ingredient.

5. The method of producing gels of high viscosity which comprises combining finely divided bentonitic clay with a small proportion of finely divided high alumina cement containing monocalcium aluminate as a principal ingredient and introducing the combined materials into water.

6. The method of producing gelatinous suspensions which comprises combining with water a mixture including bentonitic clay and a small proportion of high alumina cement containing mono-calcium aluminate as a principal ingredient.

7. The method of producing gels of high viscosity which comprises combining finely divided bentonitic clay with a small proportion of coarsely ground high alumina cement containing monocalcium aluminate as a principal ingredient and introducing the combined materials into water.

8. The method of producing clay gels of thick consistency which comprises making a mixture of high alumina cement containing mono-calcium aluminate as a principal ingredient with water and adding a bentonitic clay thereto.

9. A clay gel of improved viscosity comprising water, bentonitic clay, and mono-calcium aluminate 10. As a new product of manufacture, high gelling bentonitic clay comprising bentonitic clay having mixed therewith, in a substantially dry state, a gel increasing agent consisting principally of mono-calcium aluminate.

11. As a new product of manufacture, high gelling bentonitic clay comprising bentonitic clay having mixed therewith, in a substantially dry state, between .5 and 10% of a gel increasing agent consisting principally of mono-calcium aluminate.

WINFRED B. HIRSCHMANN.